(12) United States Patent
Shen et al.

(10) Patent No.: US 11,479,710 B2
(45) Date of Patent: Oct. 25, 2022

(54) SUBSTITUTED ALKANOLAMINE SCALE INHIBITOR

(71) Applicant: Halliburton Energy Services, Inc., Houston, TX (US)

(72) Inventors: Dong Shen, The Woodlands, TX (US); Hong Sun, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/124,302

(22) Filed: Dec. 16, 2020

(65) Prior Publication Data

US 2022/0186105 A1     Jun. 16, 2022

(51) Int. Cl.
| *C09K 8/54* | (2006.01) |
| *C09K 8/80* | (2006.01) |
| *C09K 8/68* | (2006.01) |

(52) U.S. Cl.
CPC ............... *C09K 8/54* (2013.01); *C09K 8/68* (2013.01); *C09K 8/80* (2013.01); *C09K 2208/28* (2013.01); *C09K 2208/32* (2013.01)

(58) Field of Classification Search
CPC ...................................................... C09K 8/12
See application file for complete search history.

(56) References Cited

U.S. PATENT DOCUMENTS

| 4,447,342 A | * | 5/1984 | Borchardt | ............. | C09K 8/588 |
| | | | | | 166/275 |
| 2010/0000579 A1 | | 1/2010 | Reinbold et al. | | |
| 2012/0157356 A1 | * | 6/2012 | Dawson | ................ | C09K 8/605 |
| | | | | | 507/219 |
| 2015/0267520 A1 | | 9/2015 | Liang et al. | | |
| 2016/0017203 A1 | * | 1/2016 | Frederick | ................. | C09K 8/64 |
| | | | | | 166/308.3 |
| 2017/0002629 A1 | * | 1/2017 | Hurtevent | ............. | C09K 8/528 |
| 2017/0096597 A1 | | 4/2017 | Hu et al. | | |
| 2017/0347644 A1 | | 12/2017 | Silvernail et al. | | |

FOREIGN PATENT DOCUMENTS

| WO | 2010091385 A1 | 8/2010 |
| WO | 2019177594 A1 | 9/2019 |
| WO | 2020117269 A1 | 6/2020 |

OTHER PUBLICATIONS

International Search Report and Written Opinion in PCT Application No. PCT/US2020/066141, dated Sep. 6, 2021.

* cited by examiner

*Primary Examiner* — William D Hutton, Jr.
*Assistant Examiner* — Avi T Skaist
(74) *Attorney, Agent, or Firm* — McGuireWoods LLP (57) ABSTRACT

Methods for treating a subterranean formation. An example method includes introducing a treatment fluid into a wellbore penetrating the subterranean formation. The treatment fluid includes an aqueous base fluid, a cationic or amphoteric friction reducer, and a substituted alkanolamine scale inhibitor. The method further includes contacting scale deposits on a surface in fluid communication with the wellbore and/or subterranean formation with the treatment fluid.

13 Claims, 6 Drawing Sheets

SUBSTITUTED ALKANOLAMINE SCALE INHIBITOR

BACKGROUND

During the drilling, completion, and stimulation of wellbores and subterranean formations, aqueous treatment fluids are often pumped through tubular goods (e.g., pipes, coiled tubing, etc.). A considerable amount of energy may be lost due to friction between the aqueous treatment fluid in turbulent flow and the formation, the wellbore, and/or the tubular goods located within the wellbore. As a result of these energy losses, additional horsepower may be necessary to achieve the desired treatment.

For example, in fracturing operations, a treatment fluid utilizes either an increased viscosity (e.g., a gelled fluid) or a high flow rate (e.g., a high-rate water) to create or extend one or more fractures in the formation. As the treatment fluid flows across the surfaces in the formation, the wellbore, and related tubular goods, the frictional forces between the treatment fluid and surfaces are amplified relative to non-viscosified fluids under normal flow because of the increased viscosity or high flow rate of the treatment fluid. The amplified friction forces translate to a need for increasing the energy input to achieve the desired pressure and/or flow rate for the treatment fluid. Increasing energy input increases the cost of the fracturing operation.

To reduce these energy losses, friction reducers can be used in aqueous treatment fluids. However, most of the friction reducers are sensitive to the total dissolved solids of the local environment (e.g., either the treatment fluid or the formation fluids encountered during an operation). As used herein, total dissolved solids ("TDS") refers to the sum of all minerals, metals, cations, and anions dissolved in water, which is differentiated from suspended solids and can be separated from suspended solids via filtration. As most of the dissolved solids are typically salts, the amount of salt in water is often described by the concentration of total dissolved solids in the water. As the TDS increases, many friction reducers lose function and, in some instances, may further aggravate the situation by precipitating out of the fluid.

In some cases, prior to, during, or after the production of a fractured subterranean formation, a scale inhibitor is placed into the formation to inhibit the formation of scale deposits in the production conduit. As used herein, the term "scale" refers to a mineral deposit or coating formed on the surface of metal, rock, or other material and "scale inhibitor" refers to a chemical agent or treatment used to control such deposition or coating. Scale inhibitor treatment fluids may traditionally be continuously injected into a wellbore through an injection port, for example, during completion operations. In some cases, a scale inhibitor is included with the treatment fluids used to fracture a subterranean formation, such that the scale inhibitor absorbs into the matrix and dissolves therein to prevent or reduce scale deposition. Current methods utilize a negatively charged or anionic scale inhibitor, which may negatively interact with a cationic or amphoteric friction reducer thereby negatively impacting the fluid performance.

Accordingly, a need exists for a scale inhibitor that is compatible with cationic or amphoteric friction reducers in high TDS slick-water fluids.

BRIEF DESCRIPTION OF THE DRAWINGS

The drawings illustrate certain aspects of some of the present disclosure, and should not be used to limit or define the disclosure.

DETAILED DESCRIPTION

The compositions, methods, and/or systems disclosed herein may relate to subterranean operations and, in some compositions, methods, and/or systems, to introduction of a treatment fluid into a subterranean formation penetrated by a wellbore. Any suitable treatment fluid for a given application may be used and should not be limited herein. Suitable treatment fluids may include, but are not limited to, a pad fluid, a fracturing fluid, a post-flush fluid, drilling fluid, completion fluid, acidizing fluid, polymer flooding fluids for enhanced oil recovery, fluids for coiled tubing milling, and/or any combination thereof. The formation treatment may be performed in an initial fracturing operation, or during a re-fracturing operation after an initial fracturing operation has been performed on the subterranean zone. The treatment fluid may be any suitable aqueous based fluid, which may include a high total dissolved solids concentration. As used herein, the term "high total dissolved solids" or "high TDS" broadly refers to total dissolved solids in the treatment fluid, including salts, ranging from about 1 mg/L to 350,000 mg/L, from about 500 mg/L to about 350,000 mg/L, from about 1,000 mg/L to about 300,000 mg/L, from about 1,000 mg/L to 250,000 mg/L, and/or any value or range of values therein. The treatment fluid may comprise an aqueous base fluid, a friction reducer, a substituted alkanolamine scale inhibitor, and/or any combinations thereof.

The treatment fluid may comprise an aqueous base fluid. Any suitable aqueous base fluid may be used and should not be limited herein. Suitable aqueous base fluids may include fresh water, saltwater, brine, seawater, and/or any other aqueous base fluid that may not undesirably interact with the other components used in accordance with the present disclosure or with the subterranean formation. The aqueous base fluid may be present in the treatment fluid in an amount of about 80% to about 99.95%, or about 85% to about 95%, or about 90% to about 99.99% based on a total weight of the treatment fluid, and/or any value or range of values therein.

In a non-limiting example, the aqueous base fluid may comprise a brine or a combination of brines. Suitable brines may be saturated or unsaturated as desired for a particular applications. One or more salts may be added to water to provide a brine that includes the dissolved salt and the water. Suitable dissolved salts may include monovalent salts, divalent salts, trivalent salts, and any combinations thereof. Mixtures of monovalent, divalent, and trivalent salts may also be used. Suitable brines may include, but are not limited to, saturated or partially saturated aqueous solutions comprising halide-containing salts of Group 1 or alkali metal salts, such as sodium chloride, sodium bromide, Group 2 or alkaline earth metal salts such as calcium chloride, calcium bromide, other divalent metal halide salts such as zinc bromide, metal formate-containing compounds such as sodium formate, cesium formate, potassium formate, methyl formate, ethyl formate, methyl chloro formate, triethyl orthoformate, trimethyl orthoformate, derivatives thereof, or combinations thereof.

The treatment fluid may further comprise a friction reducer. A friction reducer may be added to the treatment fluid to form a slick-water fluid. Any friction reducer capable of reducing the friction created within the treatment fluid as it may flow through the treatment system may be used and should not be limited herein. In an embodiment, the friction reducer may be an amphoteric polymer, a cationic polymer, or any combinations thereof. In an embodiment, a friction reducer may be a high molecular weight water soluble polymer. As used herein, "high molecular weight" may refer to a polymer with an average molecular weight of about 14,000,000 Dalton or greater. Optionally, "high molecular weight" may refer to a polymer with a molecular weight of at least about 1,500,000 Dalton or greater. The molecular weight of a polymer may be determined in any suitable manner and should not be limited herein. In a non-limiting example, the molecular weight of a water soluble polymer may be determined by measuring the intrinsic viscosity using a capillary viscometer. First, the viscosity of a water soluble polymer in a solution of 1 M NaCl measured at a temperature of about 30° C., with a pH of about 7, for polymer concentrations of 0.05 wt. %, 0.025 wt. %, and 0.01 wt. % may be obtained; then the value for a polymer concentration of about 0 wt. %, corresponding to the polymers intrinsic viscosity, may be extrapolated. Finally, the Mark-Houwink equation may provide the average molecular weight of said polymer by using the measured intrinsic viscosity.

Suitable friction reducers may comprise a synthetic polymer, an amphoteric polymer, a cationic polymer, and/or any combination thereof. Additionally, suitable friction reducers may be polymers and/or copolymers. The term "copolymer," as used herein, is not limited to polymers comprising two types of monomeric units, but includes any combination of monomeric units, e.g., terpolymers, and tetrapolymers. An example of a suitable friction reducer comprises a quaternized aminoalkyl acrylate, such as a copolymer of acrylamide and dimethylaminoethyl acrylate quaternized with benzyl chloride. Another example of a suitable friction reducer comprises acrylamide. An example of a suitable friction reducer comprising acrylamide is a copolymer of acrylamide and acrylic acid. Such friction reducers may further comprise additional monomers, such as 2-acrylamido-2-methylpropanesulfonic acid, N,N-dimethyl acrylamide, vinylsulfonic acid, N-vinyl acetamide, N-vinyl formamide, and mixtures thereof. In certain embodiments, suitable friction reducers may comprise an at least one cationic monomer selected from the group consisting of (meth)acrylamidopropyltrimethyl ammonium halides, (meth)acryloyloxyethyltrimethyl ammonium halides, (meth)acryloyloxyethyltrimethyl ammonium methyl sulfate, diallyl dimethyl ammonium halides, diallylamine, methyldiallylamine, dimethylaminoethylmethacrylate, dimethylaminopropylmethacrylamide, and/or any combinations thereof. Optionally, suitable friction reducers may comprise an at least one amphoteric polymer selected from the group consisting of acrylamide, acrylic acid, diallyldimethylammonium chloride, vinyl sulfonate/vinyl amide/acrylamide terpolymers, vinyl sulfonate/acrylamide copolymers, acrylamide/acrylamido-methylpropanesulfonic acid copolymers, acrylamide/vinylpyrrolidone copolymers; sodium carboxymethyl cellulose, poly[dialkylaminoacrylate-co-acrylate-graftpoly(ethyleneoxide)], acrylamide/octadecyldimethylammoniummethyl methacrylate bromide copolymer, dimethylaminoethyl, methacrylate/vinyl pyrrolidone/hexadecyldimethylammoniumethyl methacrylate bromide terpolymer, acrylamide/2-acrylamido-2-methyl propane sulfonic acid/2-ethylhexyl methacrylate terpolymer, and/or any combinations thereof. Without limitation, the friction reducer may be included in the treatment fluid to provide a desired amount of friction reduction. For example, the friction reducer may be included in the treatment fluid, for example, in an amount equal to or less than 2.0% by weight of an aqueous-based fluid present in the treatment fluid. In an embodiment, a friction reducer may be included in the treatment fluid in an amount of from about 0.02% to about 2.0%, or from about 0.025% to about 0.3%, or from about 0.2% to about 0.6%, or from about 0.6% to about 1.0%, or from about 1.0% to about 1.5%, or from about 1.5% to about 2.0% by weight of an aqueous-based fluid present in the treatment fluid, and/or any value or range of values therein. Without limitation, the friction reducer may be included in the treatment fluid in an amount sufficient to reduce friction without gel formation upon mixing. By way of example, the treatment fluid including the friction reducer may not exhibit an apparent yield point.

The slick-water fluid may have any suitable viscosity for a given application and should not be limited herein. The treatment fluid may comprise a viscosity of about 0.5 cP to about 20 cP, or about 1 cP to about 5 cP, or about 5 cP to about 20 cP, and/or any value or range of values therein. In certain embodiments, slick-water base fluid may comprise a density of about 1.0 g/cc to about 1.1 g/cc, or about 1.1 g/cc to about 1.3 g/cc, or about 1.3 g/cc to about 1.5 g/cc, and/or any value or range of values therein. Slick-water base fluids may be used in any suitable treatment fluid and should not be limited herein.

The treatment fluid may further comprise a clay control agent. Any suitable clay control agent that may chemically compatible with a substituted alkanolamine scale inhibitor may be used and should not be limited herein. In certain embodiments, the clay control agent may be positively charged and may not be compatible with an anionic friction reducer. Suitable clay control agents may include, but are not limited to, potassium chloride, sodium chloride, ammonium chloride, tetramethyl ammonium chloride, cationic polymers, cationic surfactants, hydrophobic resins, transition metals, furfuryl alcohols, ethylene glycol, quaternary amines, bisquaternary amines, and/or any combinations thereof. A clay control agent may be present in the treatment fluid in any suitable amount and should not be limited herein. In an embodiment, the clay control agent may be present in the treatment fluid in an amount of about 0.1 wt. % to about 10 wt. %, or about 0.1 wt. % to about 3 wt. %, or about 0.5 wt. % to about 2 wt. %, and/or any value or range of values therein.

The treatment fluid may further comprise a substituted alkanolamine scale inhibitor. Any substituted alkanolamine scale inhibitor capable of reducing and/or preventing the formation of mineral scales in a treatment system may be used. As used herein, the term "inhibit" and its derivatives refer to lessening the tendency of a phenomenon to occur and/or the degree to which that phenomenon occurs. The term "inhibit" does not imply any particular degree or amount of inhibition. The substituted alkanolamine scale inhibitor may be compatible with cationic and amphoteric friction reducers. In other words, the substituted alkanolamine scale inhibitor may not react and/or may have limited interaction with the friction reducer such that the substituted alkanolamine scale inhibitor may not negatively affect the ability of the friction reducers to reduce the friction of the treatment fluid. Optionally, the substituted alkanolamine scale inhibitor may be compatible in treatment fluids with a high total dissolved solid concentration. The substituted alkanolamine scale inhibitor may be present in the treatment fluid in any suitable amount and should not be limited herein. In an embodiment, the substituted alkanolamine scale inhibitor may be present in the treatment fluid in an amount of about 5 mg/L to about 1,000 mg/L, or about 15 mg/L to about 500 mg/L, or about 50 mg/L to about 200 mg/L by weight of the treatment fluid, or any value and/or range of values therein.

The substituted alkanolamine scale inhibitor may be any suitable substituted alkanolamine capable of providing scale inhibition properties in treatment fluids. By way of example, a substituted alkanolamine wherein at least one substituent is terminated with a phosphonate or a phosphonic acid may be used. Suitable substituted alkanolamines may include, but are not limited to, a substituted alkanolamine of Formula (1) as follows:

(1)

wherein R1, may be selected from the group consisting of an alkyl group, an alkenyl group, an alkynyl group, a phenyl or phenylene group, a heteroatom substituted alkyl group, a heteroatom substituted alkenyl group, a heteroatom substituted alkynyl group, or a heteroatom substituted phenyl group, wherein R2 and R3 may be independently selected from the group consisting of a hydrogen, an alkyl group, an alkenyl group, an alkynyl group, a heteroatom substituted alkyl group, a heteroatom substituted alkenyl group, a heteroatom substituted alkynyl group, a heteroatom substituted phenyl group, an alkyl group terminated by a phosphonate, an alkyl group terminated by a phosphonic acid, an alkenyl group terminated by a phosphonate, an alkenyl group terminated by a phosphonic acid, an alkynyl group terminated by a phosphonate, an alkynyl group terminated by a phosphonic acid, or any combinations thereof. Suitable heteroatoms that may be substituted in R1, R2, and/or R3 may include, but are not limited to, nitrogen, oxygen, sulfur, phosphorous, and silicon, among others. The alkyl, alkenyl, alkynyl, or phenyl or phenylene (or heteroatom substituted) groups of R1, R2, and R3, may be the same or different and, in some embodiments, include about 1 carbon atom to about 5 carbon atoms, or more particularly, include about 1 carbon atom to about 3 carbon atoms. For example, R1 may be a chain of 2 to 5 carbon atoms, R2 may be a chain of 1 to 3 carbon atoms terminated by a phosphonate or a phosphonic acid, while R3 may be a chain of 1 to 3 carbon atoms terminated by a phosphonate or a phosphonic acid.

An example of a suitable substituted alkanolamine scale inhibitor may include, but is not limited to, a hydroxyethylamino-di(methylene phosphoric acid) (HADMP or HEMPA) of Formula (2) as follows:

(2)

wherein the hydroxyethylamino-di(methylene phosphonic acid) scale inhibitor may be cationic in nature and therefore may have limited, if any, interactions with an amphoteric and/or cationic friction reducer present in the treatment fluid. In an embodiment, the substituted alkanolamine scale inhibitor may be cationic in nature. In an embodiment, the substituted alkanolamine scale inhibitor may not be compatible with an anionic friction reducer.

Optionally, the substituted alkanolamine scale inhibitor may be effective at a pH ranging from about 6 to about 9. In certain embodiments, the treatment fluid may further comprise a pH adjustor. The treatment fluid may comprise a a pH adjustor if the pH of the substituted alkanolamine scale inhibitor is less than a target or preferred pH of the treatment fluid. In a non-limiting example, a pH adjustor may be added to the treatment fluid if the pH of the substituted alkanolamine scale inhibitor is about 4. The pH adjustor may alter the pH of the treatment fluid to be within a range of about 7 to about 8.5. In this non-limiting example, the pH adjustor may be an acid-neutralize agent such as an alkaline, caustic, or basic solution. Suitable pH adjustors may include, but are not limited to, Group 1 metal hydroxides, bicarbonates salts, bronsted bases, and/or any combinations thereof. Any suitable pH adjustor for a given application may be used and should not be limited herein. The substituted alkanolamine scale inhibitor may be effective at any pH and should not be limited herein.

Substituted alkanolamine scale inhibitors may be added to a subterranean formation before, after, or during the subterranean operation. In some embodiments, the substituted alkanolamine scale inhibitor may be added to a treatment fluid and carried with the treatment fluid during a subterranean operation. In certain embodiments, the substituted alkanolamine scale inhibitor may be added to a treatment fluid during a remedial operation. In such embodiments, the substituted alkanolamine scale inhibitor may be added to the formation after the placement and setting of a particulate pack and/or after the formation of scale build-up on the surface of the subterranean formation. In such embodiments, a remedial fluid may be used to carry the substituted alkanolamine scale inhibitor into the well bore and through a particulate pack. By way of example, a particulate pack may be contacted by a substituted alkanolamine scale inhibitor. This technique also may be used as a subsequent treatment method to periodically treat the particulate pack over time, among other purposes, in order to maintain permeability in the particulate pack.

Optionally, the treatment fluid may comprise an additive. The additive may be used to adjust a property of the treatment fluid, for example, viscosity, density, etc. Examples of suitable additives may include, but are not limited to, substituted alkanolamine scale inhibitors, corrosion inhibitors, surfactants, gel stabilizers, anti-oxidants, polymer degradation prevention additives, relative permeability modifiers, scale inhibitors, foaming agents, defoaming agents, antifoaming agents, iron control agents, particulate diverters, salts, fluid loss control additives, gas, clay control agents, dispersants, flocculants, scavengers (e.g., $H_2S$ scavengers, $CO_2$ scavengers or $O_2$ scavengers), gelling agents, lubricants, friction reducers, bridging agents, viscosifiers, weighting agents, solubilizers, paraffin/asphaltenes inhibitors, emulsion breaker, hydrate inhibitors, consolidating agents, bactericides, clay stabilizers, breakers, delayed release breakers, or any combination thereof. With the benefit of this disclosure, one of ordinary skill in the art will be able to formulate a treatment fluid having properties suitable for a desired application.

The present disclosure provides treatment fluids, methods, and systems for treating a subterranean formation. The treatment fluids may include aqueous base fluid, an amphoteric or cationic friction reducer, and a substituted alkanolamine scale inhibitor. The methods may include preparing the treatment fluid comprising a slick-water base fluid, an amphoteric or cationic friction reducer, and a substituted alkanolamine scale inhibitor. The treatment fluid may be prepared on-site on the fly or at an off-site facility. The treatment fluid may be prepared in any suitable manner in any location so long as there may be no destabilization effect that may lead to precipitation or flocculation. The methods may include pumping the treatment fluid in a wellbore penetrating a subterranean formation. The methods may also include introducing the treatment fluid into a portion of the subterranean formation from the wellbore. The systems may include pumping and mixing equipment to convey the treatment fluid to the interval of the wellbore comprising the target subterranean formation.

Example systems may comprise a pump fluidly coupled to a tubular, the tubular containing a treatment fluid as described herein. The pump may be a high-pressure pump. As used herein, the term "high-pressure pump" will refer to a pump that is capable of delivering a fluid downhole at a pressure of about 1000 psi or greater. A high-pressure pump may be used when it is desired to introduce the treatment fluid to a subterranean formation at or above a fracture gradient of the subterranean formation, but it may also be used in cases where fracturing is not desired. In some examples, the high-pressure pump may be capable of fluidly conveying particulate matter, such as proppant particulates, into the subterranean formation. Suitable high-pressure pumps will be known to one having ordinary skill in the art and may include, but are not limited to, floating piston pumps and positive displacement pumps. In other examples, the pump may be a low-pressure pump. As used herein, the term "low-pressure pump" will refer to a pump that operates at a pressure of about 1000 psi or less. In some examples, a low-pressure pump may be fluidly coupled to a high-pressure pump that is fluidly coupled to the tubular. That is, the low-pressure pump may be configured to convey the treatment fluid to the high-pressure pump. In such examples, the low-pressure pump may "step up" the pressure of the treatment fluid before it reaches the high-pressure pump. In any example, a high-pressure pump and/or a low-pressure pump may convey the treatment fluid to the location of a target subterranean formation. The pumps may supply sufficient pressure to allow the treatment fluid to fracture the subterranean formation. That is, the pumps may meet or exceed the fracture gradient of the subterranean formation.

In some examples, the systems described herein may further comprise a mixing tank that is upstream of the pump and is the vessel in which the treatment fluid is formulated. In various examples, the pump (e.g., a low-pressure pump, a high-pressure pump, or a combination thereof) may convey the treatment fluid from the mixing tank to the transporting conduit. In other examples, the treatment fluid may be formulated offsite and transported to a worksite, in which case the treatment fluid may be introduced to the transporting conduit via the pump either directly from its shipping container (e.g., a truck, a railcar, or a barge) or from a transport pipeline. In either case, the treatment fluid may be drawn into the pump, elevated to an appropriate pressure, and then introduced into the transporting conduit for delivery downhole.

When desired for use, the friction reducer and the substituted alkanolamine scale inhibitor may be added to the aqueous base fluid and mixed as desired. In alternative examples, the friction reducer may be added to the aqueous base fluid followed by the substituted alkanolamine scale inhibitor and then mixed as desired. The components and additives of the treatment fluid may be added or introduced to one another in any order and at any time during the use of the treatment fluid.

Figure 1:
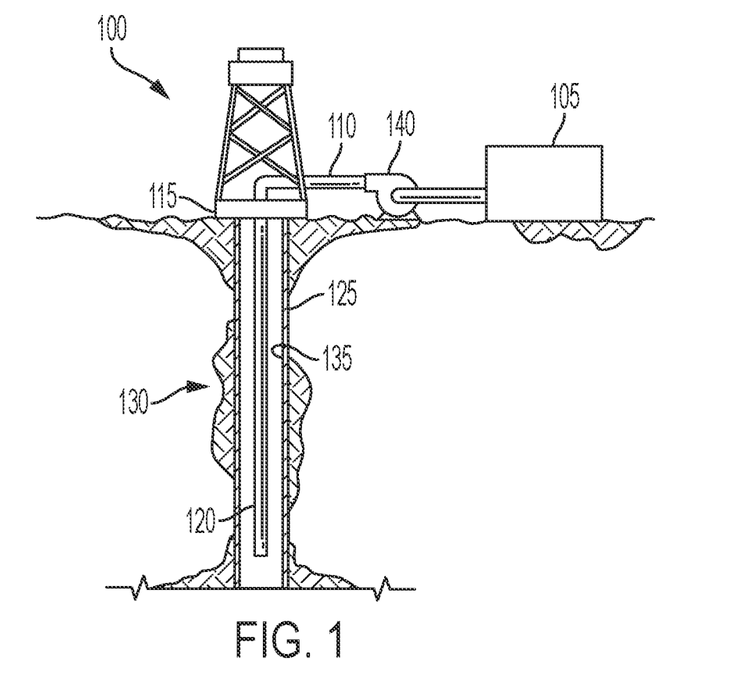
FIG. 1 is a schematic illustrating a system of surface equipment for the preparation and delivery of a treatment fluid to a wellbore.

Example methods of using the substituted alkanolamine scale inhibitor may now be described in more detail with reference to FIG. 1. Any previous examples of the substituted alkanolamine scale inhibitor may apply in the context of FIG. 1. FIG. 1 illustrates a schematic of the surface and near-surface portions of a system that can deliver the treatment fluids described herein to a downhole location, according to one or more examples. It should be noted that while FIG. 1 generally depicts a land-based system, it is to be recognized that like systems may be operated in subsea locations as well. As depicted in FIG. 1, system 100 may include mixing tank 105, in which a treatment fluid comprising an aqueous base fluid, an amphoteric or cationic friction reducer, and a substituted alkanolamine scale inhibitor may be formulated. The treatment fluid may be conveyed via line 110 to wellhead 115, where the treatment fluid enters tubular 120. Tubular 120 may extend from wellhead 115 into a wellbore 125 penetrating subterranean formation 130. Wellbore 125 may be any type of wellbore including vertical, horizontal, deviated, etc. The illustrated portion of wellbore 125 is cased with a casing 135. It is to be understood that in some examples wellbore 125 may be uncased. Upon being ejected from tubular 120, the treatment fluid may subsequently enter into subterranean formation 130 as described in FIG. 2 below. Pump 140 may be configured to raise the pressure of the treatment fluid to a desired degree before its introduction into tubular 120. Examples of treatment fluids may include, but are not limited to, fracturing fluids, acidizing fluids, fluids used for enhanced oil recovery, or any such fluids comprising.

Although not depicted in FIG. 1, the treatment fluid may, in some examples, flow back to wellhead 115 and exit subterranean formation 130. In some optional examples, the treatment fluid that has flowed back to wellhead 115 may subsequently be recovered and recirculated to subterranean formation 130.

Figure 2:
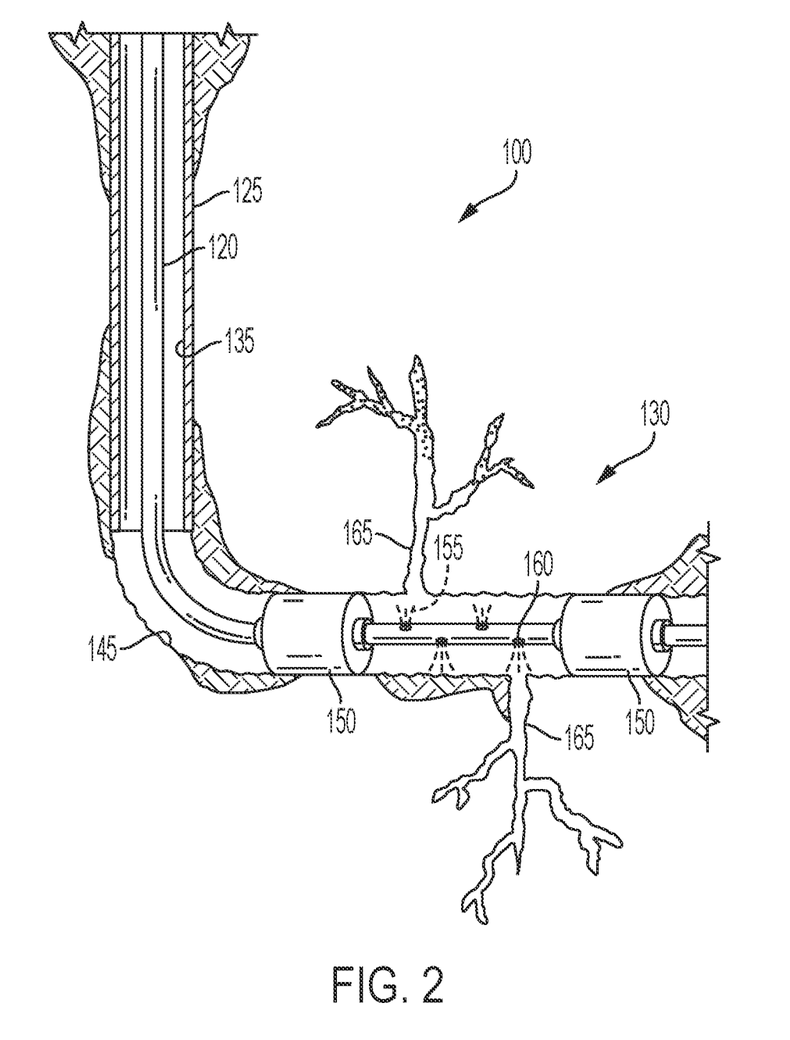
FIG. 2 is a schematic illustrating the placement of a treatment fluid into a fracture in a subterranean formation.
Figure 3:
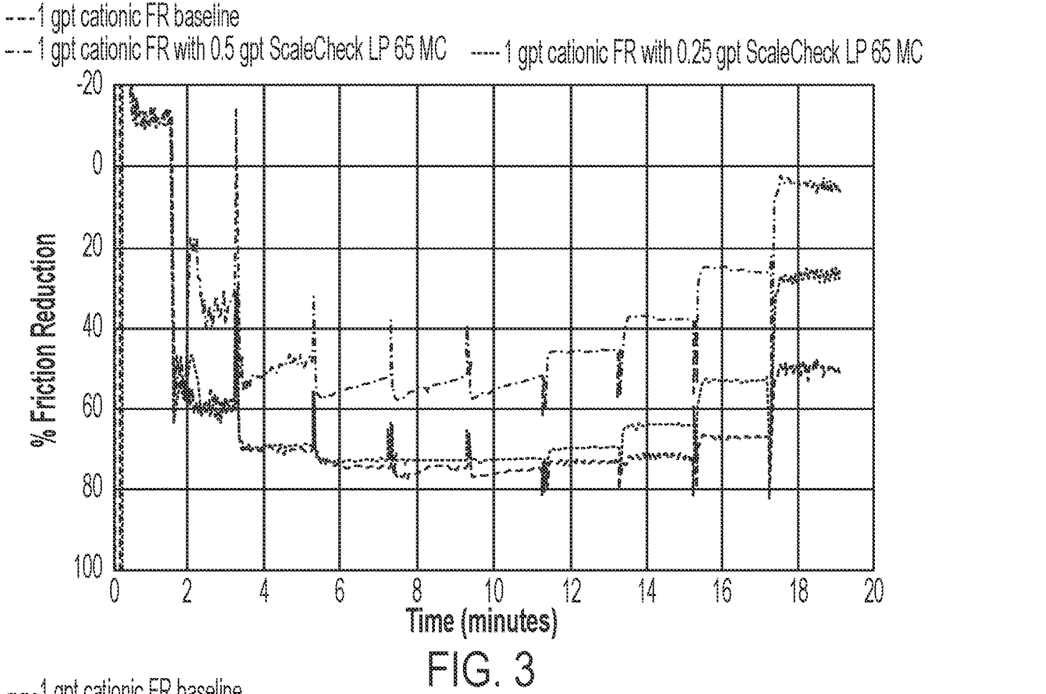
FIGS. 3-6 are graphs that illustrate the effect of a scale inhibitor on the performance of a cationic friction reducer.
Figure 4:
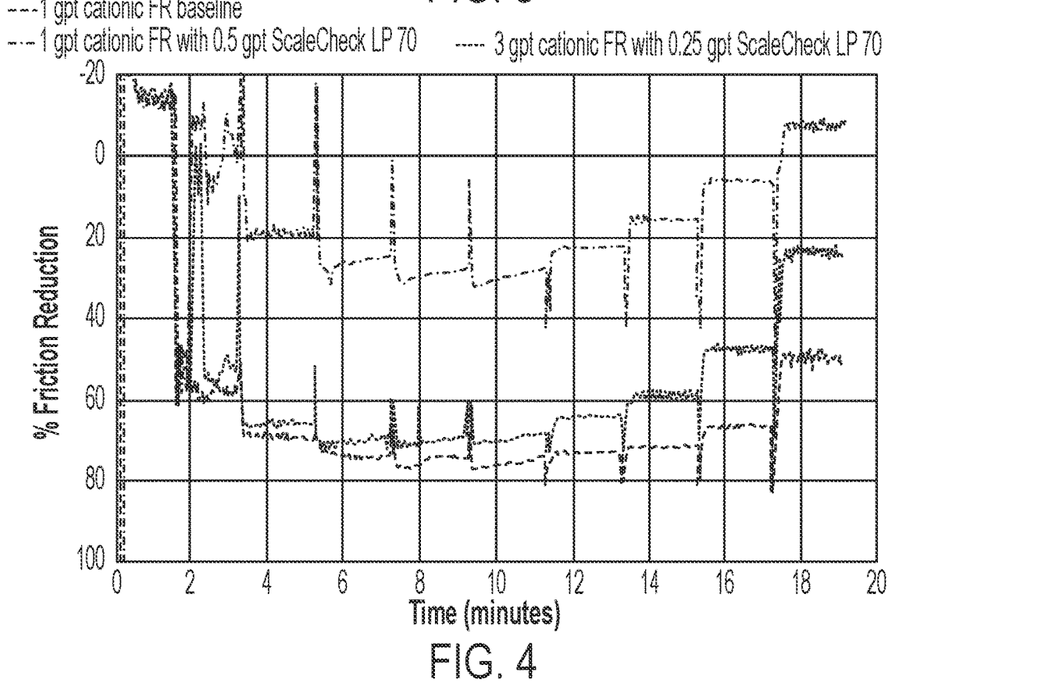
Figure 5:
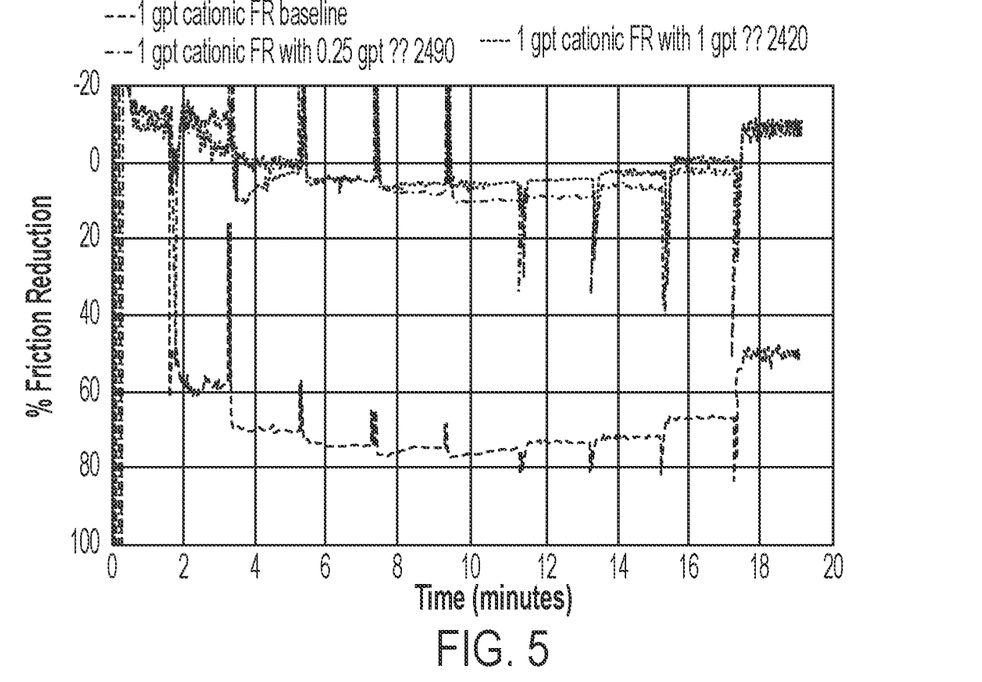

FIG. 2 illustrates a schematic of the downhole portion of the system 100 illustrated in FIG. 1, according to one or more examples. As depicted in FIG. 2, tubular 120 extends from the wellhead 115 (as illustrated in FIG. 1) into wellbore 125 penetrating subterranean formation 130. After descending through the heel 145 of the wellbore 125, tubular 120 may be coupled to one or more packers 150 positioned to isolate an interval of wellbore 125. A treatment fluid 155, as described herein, may exit tubular 120 through openings 160. The treatment fluid 155 may be introduced into the subterranean formation 130 via a primary fracture 165 of other such opening into the subterranean formation 130. If the treatment fluid 155 is a fracturing fluid, it may have created or enhanced the primary fracture 165. If the treat- ment fluid 155 is an acidizing fluid, it may contact the walls of the subterranean formation 130, and also the channels within the primary fracture 165 and increase hydrocarbon permeability there through. If the treatment fluid 155 is an enhanced oil recovery fluid, it may be partially miscible with, or otherwise assist in conveying, a hydrocarbon fluid flowing out of the subterranean formation 130, thus enhancing hydrocarbon recovery from the subterranean formation 130.

It is to be recognized that system 100 is merely exemplary in nature, and various additional components may be present that have not necessarily been depicted in FIGS. 1 and 2 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, and temperature sensors.

It should be clearly understood that the examples illustrated by FIGS. 1 and 2 are merely general applications of the principles of this disclosure in practice, and a wide variety of other examples are possible. Therefore, the scope of this disclosure is not limited in any manner to the details of FIGS. 1 and 2 as described herein.

Provided are methods for treating a subterranean formation. An example method comprises introducing a treatment fluid into a wellbore penetrating the subterranean formation. The treatment fluid comprises an aqueous base fluid, a cationic or amphoteric friction reducer, and a substituted alkanolamine scale inhibitor. The method further comprises contacting scale deposits on a surface in fluid communication with the wellbore and/or subterranean formation with the treatment fluid.

Additionally or alternatively, the method may include one or more of the following features individually or in combination. The substituted alkanolamine scale inhibitor may comprise a molecule having the molecular formula:

wherein R1 is selected from the group consisting of an alkyl group, an alkenyl group, an alkynyl group, a phenyl or phenylene group, a heteroatom substituted alkyl group, a heteroatom substituted alkenyl group, a heteroatom substituted alkynyl group, a heteroatom substituted phenyl group, and any combination thereof. R2 may be selected from the group consisting of a hydrogen, an alkyl group, an alkenyl group, an alkynyl group, a heteroatom substituted alkyl group, a heteroatom substituted alkenyl group, a heteroatom substituted alkynyl group, a heteroatom, and any combination thereof. R3 may be selected from the group consisting of a hydrogen, an alkyl group, an alkenyl group, an alkynyl group, a heteroatom substituted alkyl group, a heteroatom substituted alkenyl group, a heteroatom substituted alkynyl group, a heteroatom, and any combination thereof. The substituted alkanolamine scale inhibitor may comprise hydroxyethylamino-di(methylene phosphonic acid). The substituted alkanolamine scale inhibitor may be cationic in nature, wherein the substituted alkanolamine scale inhibitor may not react with or may have limited interaction with the cationic or amphoteric friction reducer. The friction reducer may be cationic, wherein the cationic friction reducer comprises at least one cation selected from the group consisting of (meth)acrylamidopropyltrimethyl ammonium halides, (meth)acryloyloxyethyltrimethyl ammonium halides, (meth)acryloyloxyethyltrimethyl ammonium methyl sulfate, diallyl dimethyl ammonium halides, diallylamine, methyldiallylamine, dimethylaminoethylmethacrylate, dimethylaminopropylmethacrylamide, and any combination thereof. The substituted alkanolamine scale inhibitor may be present in the treatment fluid in an amount of about 5 mg/L to about 1,500 mg/L. The aqueous base fluid may have a total dissolved solids content of about 10,000 mg/L to about 300,000 mg/L. The method may further comprise forming a proppant pack in the subterranean formation; contacting the formed proppant pack with the substituted alkanolamine scale inhibitor; and surpressing mineral scale build up proximate to the proppant pack via the substituted alkanolamine scale inhibitor. The treatment fluid may further comprise proppant particulates. The treatment fluid may further comprise a positively charged clay control agent. The positively charged clay control agent may be selected from the group consisting of potassium chloride, sodium chloride, ammonium chloride, tetramethyl ammonium chloride, cationic polymers, cationic surfactants, hydrophobic resins, transition metals, furfuryl alcohols, ethylene glycol, quaternary amines, bisquaternary amines, and any combinations thereof.

Provided are treatment fluids for treating a subterranean formation. An example treatment fluid comprises an aqueous base fluid, a cationic friction reducer, and a substituted alkanolamine scale inhibitor.

Additionally or alternatively, the treatment fluid may include one or more of the following features individually or in combination. The substituted alkanolamine scale inhibitor may comprise a molecule having the molecular formula:

wherein R1 is selected from the group consisting of an alkyl group, an alkenyl group, an alkynyl group, a phenyl or phenylene group, a heteroatom substituted alkyl group, a heteroatom substituted alkenyl group, a heteroatom substituted alkynyl group, a heteroatom substituted phenyl group, and any combination thereof. R2 may be selected from the group consisting of a hydrogen, an alkyl group, an alkenyl group, an alkynyl group, a heteroatom substituted alkyl group, a heteroatom substituted alkenyl group, a heteroatom substituted alkynyl group, a heteroatom, and any combination thereof. R3 may be selected from the group consisting of a hydrogen, an alkyl group, an alkenyl group, an alkynyl group, a heteroatom substituted alkyl group, a heteroatom substituted alkenyl group, a heteroatom substituted alkynyl group, a heteroatom, and any combination thereof. The substituted alkanolamine scale inhibitor may comprise hydroxyethylamino-di(methylene phosphonic acid). The substituted alkanolamine scale inhibitor may be cationic in nature, wherein the substituted alkanolamine scale inhibitor may not react with or may have limited interaction with the cationic or amphoteric friction reducer. The friction reducer may be cationic, wherein the cationic friction reducer comprises at least one cation selected from the group consisting of (meth)acrylamidopropyltrimethyl ammonium halides, (meth)acryloyloxyethyltrimethyl ammonium halides, (meth)acryloyloxyethyltrimethyl ammonium methyl sulfate, diallyl dimethyl ammonium halides, diallylamine, methyldiallylamine, dim ethylaminoethylmethacrylate, dim ethylaminopropylmethacrylamide, and any combination thereof. The substituted alkanolamine scale inhibitor may be present in the treatment fluid in an amount of about 5 mg/L to about 1,500 mg/L. The aqueous base fluid may have a total dissolved solids content of about 10,000 mg/L to about 300,000 mg/L. The treatment fluid may further comprise proppant particulates. The treatment fluid may further comprise a positively charged clay control agent. The positively charged clay control agent may be selected from the group consisting of potassium chloride, sodium chloride, ammonium chloride, tetramethyl ammonium chloride, cationic polymers, cationic surfactants, hydrophobic resins, transition metals, furfuryl alcohols, ethylene glycol, quaternary amines, bisquaternary amines, and any combinations thereof. The aqueous base fluid may comprise a brine having a total dissolved solids content of about 1 mg/L to 350,000 mg/L. The aqueous base fluid may be a slick-water fluid having a viscosity of about 0.5 cP to about 20 cP.

To facilitate a better understanding of the present disclosure, the following examples of certain aspects of some of the methods, systems, and compositions are given. In no way should the following examples be read to limit, or define, the entire scope of the disclosure.

EXAMPLE 1

A series of friction reduction test were performed to determine the effect of four scale inhibitors on the performance of an amphoteric friction reducer and a cationic friction reducer in a slick-water treatment fluid. In each of the tests, 1 gallon of friction reducer per 1,000 gallons of tap water was used. The amount of scale inhibitor is varied in each test to illustrate the scale inhibitors effect on the performance of the friction reducer. These tests were performed under room temperature conditions.

These friction reduction tests were performed using a Friction Reduction Meter ("FR Meter") in accordance with the procedure listed below. The FR Meter was a closed loop pipeline apparatus designed to measure the pressure drop across an 8-foot section of a 20-foot long stainless steel pipe. The stainless steel pipe had an inner diameter of 0.5 inches with a smooth wall. The FR Meter included a storage/mixing tank connected to a fixed speed progressive cavity pump which pumped the test fluid through a magnetic flow meter then through the test pipes and a return line to the storage/mixing tank.

For each test, about 20 liters of tap water were added to the storage/mixing tank. The pump was run to circulate the water for an amount of time sufficient to fill all the pipes with water. Next, for each test an appropriate amount of the scale inhibitor was added to the storage/mixing tank with mixing. The data acquisition system measured the flow rate, tank temperature and pressure drop across the 8-foot section of pipe. At about 1 minute into the test, 1 gallon of friction reducer was added to the storage/mixing tank. Each test was run for a total of about 20 minutes, with flow rate, tank temperature and pressure drop across the 8-foot section of pipe recorded at one-second intervals. The pump rate was about 10 gallons per minute. For the commercial steel pipe, the flow was fully turbulent at a Reynolds Number of about 50,000.

The first minute of data that was collected prior to the addition of the friction reducer was used to verify instrument readings and provide a baseline of data with a known fluid. The pressure drop across the 8-foot section of pipe for the tap water containing a scale inhibitor prior to the addition of the friction reducer, was calculated from the flow rate and pipe dimensions in accordance with the following formula:

$$\Delta P_{water} = \frac{\rho V^2 L f}{2 g_c d} \quad (1)$$

wherein $\Delta P_{water}$ is the calculated pressure drop for the deionized water, $\rho$ density, V is the velocity, L is length, gc is the gravitational constant and d is the pipe diameter. The variable f was calculated in accordance with the formula below for turbulent flow.

$$f = \left\{ -2\log\left[\frac{\varepsilon/d}{3.7} - \frac{5.02}{N_{Re}}\log\left(\frac{\varepsilon/d}{3.7} + \frac{14.5}{N_{Re}}\right)\right] \right\}^{-2} \quad (2)$$

wherein $\varepsilon$ is pipe roughness, d is the pipe diameter and NRe is the Reynold's Number (Shacham, M., Isr. Chem. Eng., 8, 7E (1976)).

Following the addition of friction reducer to the tank, the measured, ten minute average pressure drop was compared to the calculated pressure drop for the water to determine the Ten Minute Average % Friction Reduction ("% FR") using the following equation:

$$\% \ FR = 1 - \frac{\Delta P_{measured}}{\Delta P_{water}} \quad (3)$$

wherein $\Delta P_{water}$ is the calculated pressure drop for the water and $\Delta P_{measured}$ is the measured, ten minute average pressure drop after introduction of the friction reducer.

Ramp testing conditions may be used to check the ability of the friction reduction to recover from varying shear and maintain its performance. This may also show the overall degradation of the friction reducer polymer over time. Ramp testing conditions are similar to the constant flow testing conditions with the exception of varying the flow rate at a specified time. Ramp testing conditions are shown in Table 1 below.

TABLE 1

| Flow Rate, gpm | Time, minutes | Ramp Conditions |
| --- | --- | --- |
| 0 | 0-0.2 | Ramp Up |
| 5 | 0.21-3.2 | Conditions |
| 9 | 3.21-5.2 | |
| 13 | 5.21-7.2 | |
| 17 | 7.21-9.2 | |
| 22 | 9.21-11.2 | |
| 17 | 11.21-13.2 | Ramp Down |
| 13 | 13.21-15.2 | Conditions |
| 9 | 15.21-17.2 | |
| 5 | 17.21-19.2 | |

The compatibility of a scale inhibitor and a friction reducer polymer may be determined by comparing the percent friction reduction of the ramp up conditions to the ramp down conditions for a flow rate. A difference in percent friction reduction greater than 5% between the two conditions for a given flow rate indicates a degradation in the performance of the friction reducer polymer. In other words, the friction reducer polymer is unable to maintain its performance and recover from the varying shear. This degradation may be cause by flow induced shear or by chemical incompatibilities with other additives in the fluid. If the difference in percent friction reduction between the two conditions for a given flow rate is less than 5%, then it may be determined that the scale inhibitor and the friction reducer polymer are chemically compatible as the friction reducer is able to maintain its performance and recover from the varying shear.

Next, four scale inhibitors were tested with 1 gallon per thousand gallons of sample (gpt) of cationic friction reducer under ramp testing conditions. The formulations of each test are shown in Table 2.

TABLE 1

| Scale Inhibitor | Amount of Scale Inhibitor in Test 1 (gpt) | Amount of Scale Inhibitor in Test 2 (gpt) | Amount of Scale Inhibitor in Test 3 (gpt) |
| --- | --- | --- | --- |
| Diethylenetriamine Pentamethylene Phosphonic Acid (DTPMP) | 0 | 0.25 | 0.5 |
| Polyacrylic Acid (PAA) | 0 | 0.25 | 0.5 |
| Sulphonated Polyacrylate Copolymer (Vs-Co) | 0 | 0.25 | 1.0 |
| HADMP | 0 | 2 | — |

Figure 6:
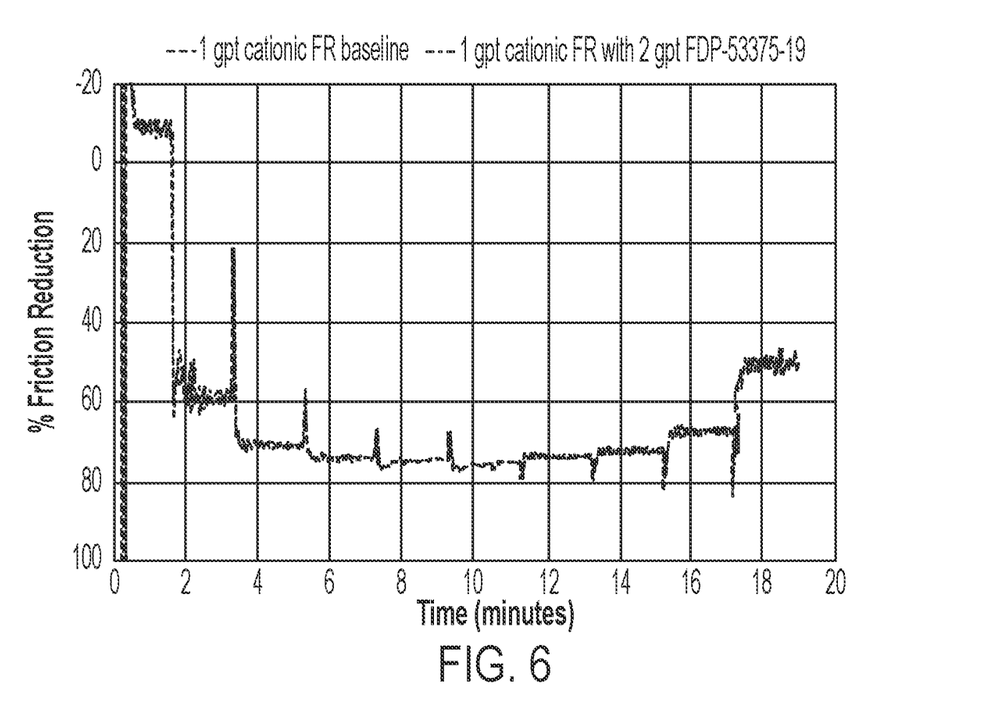
Figure 7:
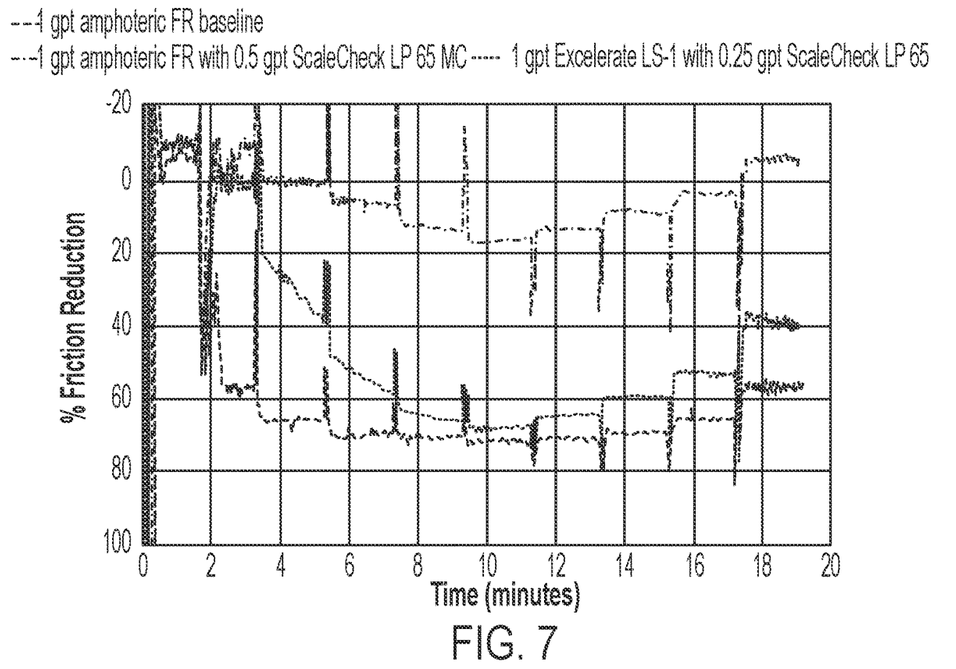
FIGS. 7-10 are graphs that illustrate the effect of a scale inhibitor on the performance of an amphoteric friction reducer.
Figure 8:
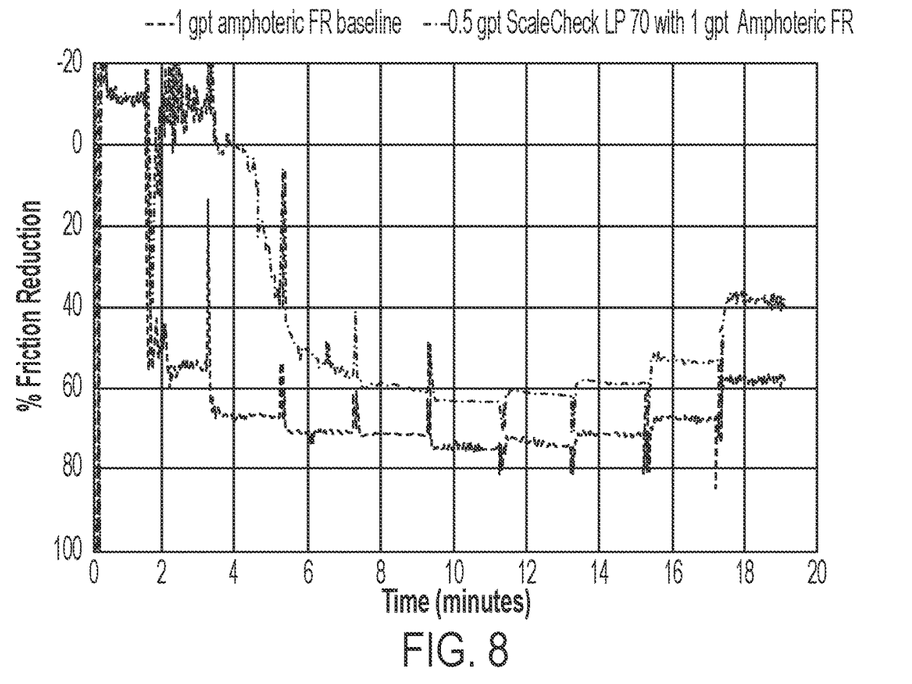
Figure 9:
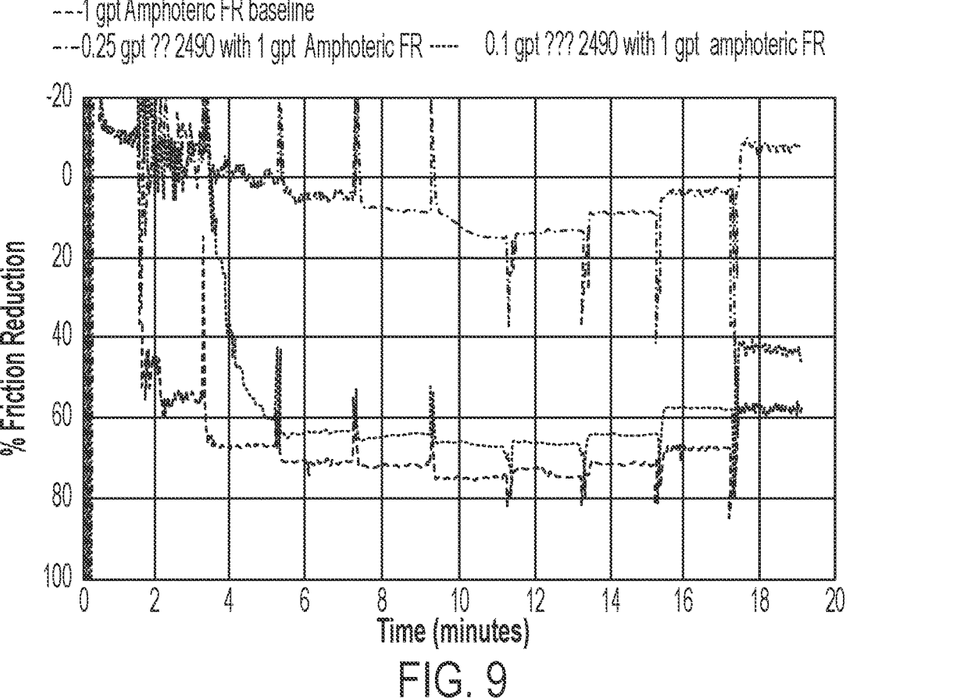

The results are illustrated in FIGS. 3-6. The results shown in FIGS. 3-5 demonstrate that the conventional scale inhibitors have a significant impact on the performance of the cationic friction reducer. As the amount of conventional scale inhibitor increases, the percent of friction reduction decreases. In contrast, FIG. 6 illustrates that HADMP does not impact the performance of the cationic friction reducer thus, HADMP is compatible with the cationic friction reducer.

Next, the four scale inhibitors were tested with 1 gallon per thousand gallons of sample (gpt) of amphoteric friction reducer under ramp testing conditions. The formulations of each test are shown in Table 3.

TABLE 3

| Scale Inhibitor | Amount of Scale Inhibitor in Test 1 (gpt) | Amount of Scale Inhibitor in Test 2 (gpt) | Amount of Scale Inhibitor in Test 3 (gpt) |
| --- | --- | --- | --- |
| Diethylenetriamine Pentamethylene Phosphoric Acid (DTPMP) | 0 | 0.25 | 0.5 |
| Polyacrylic Acid (PAA) | 0 | 0.5 | — |
| Sulphonated Polyacrylate Copolymer (Vs-Co) | 0 | 0.1 | 0.25 |
| HADMP | 0 | 2 | — |

Figure 10:
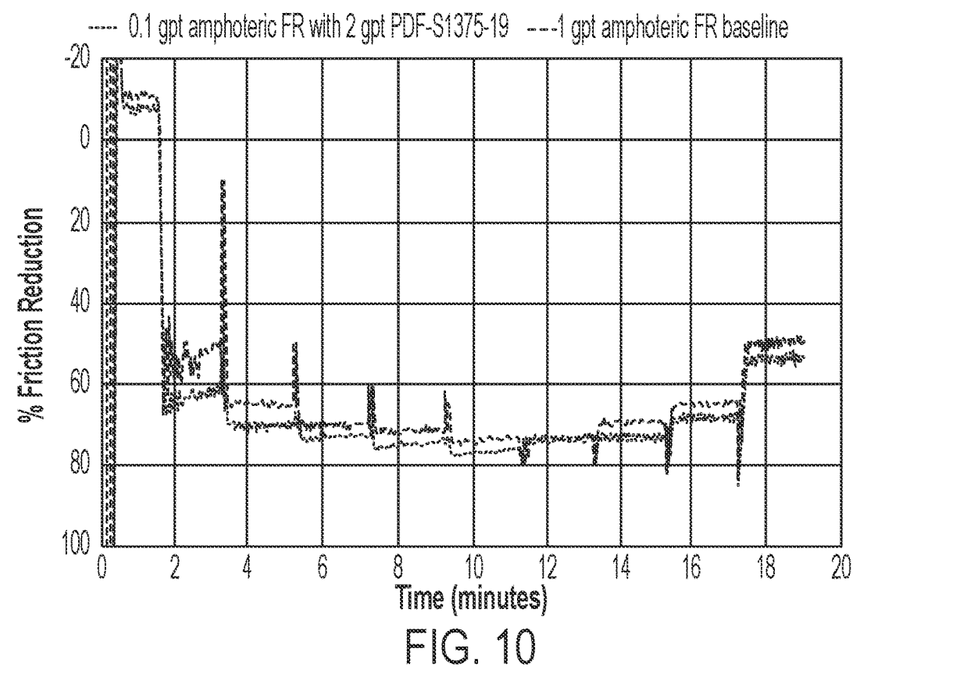

The results of the friction reduction tests are illustrated in FIGS. 7-10. The results shown in FIGS. 7-9 demonstrate that the conventional scale inhibitors have a significant impact on the performance of the amphoteric friction reducer. As the amount of conventional scale inhibitor increases, the percent of friction reduction decreases. In contrast, FIG. 10 illustrates that HEMPA does not impact the performance of the amphoteric friction reducer thus, HEMPA is compatible with the amphoteric friction reducer.

It is also to be recognized that the disclosed treatment fluids may also directly or indirectly affect the various downhole equipment and tools that may contact the treatment fluids disclosed herein. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components. Any of these components may be included in the methods and systems generally described above and depicted in FIGS. 1-10.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps. The systems and methods can also "consist essentially of" or "consist of the various components and steps." Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited. In the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

The invention claimed is:

1. A method for treating a subterranean formation, the method comprising:
   introducing a treatment fluid into a wellbore penetrating the subterranean formation, the treatment fluid comprising:
      an aqueous base fluid consisting of an aqueous brine and having a total dissolved solids content of about 10,000 mg/L to about 300,000 mg/L,
      a cationic friction reducer consisting of cations selected from the group consisting of (meth)acrylamidopropyltrimethyl ammonium halides, (meth)acryloyloxyethyltrimethyl ammonium halides, (meth)acryloyloxethyltrimethyl ammoinium methyl sulfate, diallyl dimethyl ammonium halides, diallylamine, methyldiallylamine, dimethylaminoethylmethacrylate, dimethylaminopropylmethacrylamide, and any combination thereof, and
      a substituted alkanolamine scale inhibitor;
   contacting scale deposits on a surface in fluid communication with the wellbore and/or subterranean formation with the treatment fluid.

2. The method of claim 1, wherein the substituted alkanolamine scale inhibitor comprises a molecule having the molecular formula:

wherein R1 is selected from the group consisting of an alkyl group, an alkenyl group, an alkynyl group, a phenyl or phenylene group, a heteroatom substituted alkyl group, a heteroatom substituted alkenyl group, a heteroatom substituted alkylnyl group, a heteroatom substituted phenyl group, and any combination thereof.

3. The method of claim 2, wherein R2 is selected from the group consisting of a hydrogen, an alkyl group, an alkenyl group, an alkynyl group, a heteroatom substitued alkyl group, a heteroatom substituted alkenyl group, a heteroatom substituted alkylnyl group, a heteroatom, and any combination thereof.

4. The method of claim 3, wherein R3 is selected from the group consisting of a hydrogen, an alkyl group, an alkenyl group, an alkynyl group, a heteroatom substitued alkyl group, a heteroatom substituted alkenyl group, a heteroatom substituted alkylnyl group, a heteroatom, and any combination thereof.

5. The method of claim 1, wherein the substituted alkanolamine scale inhibitor comprises hydroxyethylaminodi(methylene phosphonic acid).

6. The method of claim 1, wherein the substituted alkanolamine scale inhibitor does not react with the cationic friction reducer.

7. The method of claim 1, wherein the substituted alkanolamine scale inhibitor is present in the treatment fluid in an amount of about 5 mg/L to about 1,500 mg/L.

8. The method of claim 1, wherein the treatment fluid further comprises proppant particulates.

9. The method of claim 8, further comprising:
   forming a proppant pack in the subterranean formation;
   contacting the formed proppant pack with the substituted alkanolamine scale inhibitor; and
   suppressing mineral scale build up proximate to the proppant pack via the substituted alkanolamine scale inhibitor.

10. The method of claim 1, wherein the treatment fluid further comprises a positively charged clay control agent.

11. The method of claim 10, wherein the positively charged clay control agent is selected from the group consisting of potassium chloride, sodium chloride, ammonium chloride, tetramethyl ammonium chloride, cationic polymers, cationic surfactants, hydrophobic resins, transition metals, furfuryl alcohols, ethylene glycol, quaternary amines, bisquaternary amines, and any combinations thereof.

12. The method of claim 1, wherein the friction reducer is present in the treatment fluid in a concentration of from about 0.02% to about 2.0% by weight of the aqueous-based fluid.

13. The method of claim 1, wherein the treatment fluid has a viscosity of about 0.5 cP to about 20 cP.

* * * * *